United States Patent
Anderson et al.

(10) Patent No.: US 9,934,515 B1
(45) Date of Patent: Apr. 3, 2018

(54) CONTENT RECOMMENDATION SYSTEM USING A NEURAL NETWORK LANGUAGE MODEL

(71) Applicant: Google Inc., Mountain View, CA (US)

(72) Inventors: Glen Anderson, Palo Alto, CA (US); Michael Schuster, Saratoga, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/370,247

(22) Filed: Dec. 6, 2016

Related U.S. Application Data (63) Continuation of application No. 14/136,111, filed on Dec. 20, 2013, now Pat. No. 9,535,897.

(51) Int. Cl.
| | |
|---|---|
| *G06F 17/27* | (2006.01) |
| *G06Q 30/02* | (2012.01) |
| *H04N 21/466* | (2011.01) |
| *H04N 21/442* | (2011.01) |
| *G06F 17/30* | (2006.01) |
| *G06N 3/08* | (2006.01) |

(52) U.S. Cl.
CPC ....... *G06Q 30/0255* (2013.01); *G06F 17/276* (2013.01); *G06F 17/277* (2013.01); *G06F 17/3064* (2013.01); *G06F 17/30864* (2013.01); *G06F 17/30873* (2013.01); *G06N 3/08* (2013.01); *H04N 21/44222* (2013.01); *H04N 21/4666* (2013.01); *H04N 21/4668* (2013.01)

(58) Field of Classification Search
CPC ..... G10L 15/1822; G10L 15/16; G10L 15/00; G10L 25/30; G10L 25/54; G10L 15/01; G10L 15/08; G10L 15/26; G10L 15/32; G10L 2021/02166; G10L 21/0272; G10L 25/78; G06F 19/345; G06F 19/12; G06F 7/00
USPC ... 704/251, 255, 257, 270, 270.1, 1–10, 250
See application file for complete search history.

(56) References Cited

U.S. PATENT DOCUMENTS

| | | | |
|---|---|---|---|
| 6,922,680 | B2 | 7/2005 | Buczak |
| 2004/0133448 | A1 | 7/2004 | Higashi et al. |
| 2012/0036523 | A1 | 2/2012 | Weintraub et al. |
| 2012/0223889 | A1 | 9/2012 | Medlock et al. |
| 2014/0129371 | A1 | 5/2014 | Wilson et al. |
| 2015/0052561 | A1* | 2/2015 | Austin ............. H04N 21/44222 725/46 |
| 2015/0095026 | A1* | 4/2015 | Bisani ..................... G10L 15/08 704/232 |

FOREIGN PATENT DOCUMENTS

WO    2003/079688    9/2003

* cited by examiner

*Primary Examiner* — Huyen Vo
(74) *Attorney, Agent, or Firm* — Fish & Richardson P.C.

(57) ABSTRACT

The present disclosure relates to applying techniques similar to those used in neural network language modeling systems to a content recommendation system. For example, by associating consumed media content to words of a language model, the system may provide content predictions based on an ordering. Thus, the systems and techniques described herein may produce enhanced prediction results for recommending content (e.g. word) in a given sequence of consumed content. In addition, the system may account for additional user actions by representing particular actions as punctuation in the language model.

20 Claims, 4 Drawing Sheets

CONTENT RECOMMENDATION SYSTEM USING A NEURAL NETWORK LANGUAGE MODEL

CROSS REFERENCE TO RELATED APPLICATIONS

This application is a continuation of and claims priority to U.S. patent application Ser. No. 14/136,111, filed on Dec. 20, 2013, the entire contents of which are hereby incorporated by reference.

BACKGROUND

When providing content to a user, systems often make recommendations based on per-user information. This information may include a user history and/or contextual information. Certain recommendation techniques such as collaborative filtering and other clustering techniques merely groups items of a history together when considering recommendations. For example, if items A, B, C, D, and E are often viewed as a group, and a user views any three of the five items, the other two will be given as recommendations. Such a system does not, however, consider an ordering when providing recommendations. Accordingly, these recommendations do not exploit the additional information that may be provided by accounting for a trajectory of the user history.

BRIEF SUMMARY

Described is a recommendation system using a neural network language model. In an implementation, described is a computer-implemented method of providing recommendations including obtaining a user history for a user and associating a plurality of items in the obtained user history with a sequence of tokens. One or more of the plurality of items in the user history may be an accessed media item such as a viewed video. The method may include applying the sequence of tokens as inputs to a neural network language model, wherein at least one token of the sequence of tokens corresponds to a word in the language model. The neural network may be a recurrent neural network. The method may also include receiving a predicted word, which may correspond to a predicted item, as an output from the language model in response to the applied sequence of tokens and providing a recommendation to the user based on the predicted item.

In an implementation, described is a system for providing recommendations. The system may include a processor configured to obtain a user history for a user and associate a plurality of items in the obtained user history with a sequence of tokens. The processor may be configured to apply the sequence of tokens as inputs to a neural network language model, wherein at least one token of the sequence of tokens corresponds to a word in the language model. The processor may also be configured to receive a predicted word, which may correspond to a predicted item, as an output from the language model in response to the applied sequence of tokens and provide a recommendation to the user based on the predicted item.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

In general, large-scale data processing systems may process a vast amount of data from various sources and/or machines. As a specific example, large-scale machine learning systems may process large amounts of training data from data streams. A data stream may include training data examples corresponding to specific instances of an event or action such as when a user selects a particular video for viewing, or clicks on a particular advertisement that is served to the user. These machine learning systems may receive and process millions, or more of training examples, each example including multiple features. These features may be used to generate a model and a machine learning model may be used to make predictions based on statistics associated with features in the model. Many machine learning models use a variety of feature exploration techniques to produce more expressive models that can better capture patterns in the training data.

One such model is a language model. Languages models are known in the art and represent a function that captures the salient statistical characteristics of the distribution of sequences of words in a natural language and/or an algorithm for learning such a function. Accordingly, the language model provides the ability for a system to make probabilistic predictions of the next word from a sequence of preceding words. The language model may assign a probability to a sequence of m words $P(W_1, \ldots W_m)$ by means of a probability distribution.

When developing the language model, various architectures may be used including a neural network (e.g. a neural network language model). More specifically, in certain implementations described herein, a recurrent neural network (RNN) may be used. By using neural networks, the model may exploit the ability to learn distributed representations. A distributed representation of a symbol (e.g. word of the language) may represent a vector (or tuple) of features that characterize the meaning of a symbol. With a neural network language model, the system may rely on the training algorithm to discover grammatical features like gender, tense, and plurality, as well as semantic features of the language. This provides the ability for the model to generalize sequences that are not in the set of training word sequences, but that are similar in terms of their features (e.g. their distributed representation). Neural networks are often configured to map nearby inputs to nearby outputs, and accordingly, the predictions corresponding to a word sequence with similar features are mapped to a similar prediction. Accordingly, in a neural network, many different combinations of feature values are possible, and thus, large sets of meanings may be represented in a compact manner.

The present disclosure applies techniques similar to those used in neural network language modeling systems to a content recommendation system. Accordingly, the system may utilize common trajectories analogous to the use of particular words in a written language. For example, by associating consumed media content to words of a language model, the system may provide content predictions based on an ordering. Thus, the systems and techniques described herein may produce enhanced prediction results for recommending content (e.g. word) in a given sequence of consumed content. For example, the system may provide a video as a recommendation, which may be more effective recommendation due to the consideration of a time-sequence of previously viewed videos as processed by a RNN. In addition, the system may account for additional user actions by representing particular actions as punctuation in the language model. For example, an end session action may correspond to a period (".") as punctuation.

By utilizing a RNN language model, the system may accommodate features that cannot be accounted for with a typical N-gram language model. For example, in an N-gram language model all inputs must be categorical. In contrast, a RNN can accommodate continuous inputs (e.g. two-dimensional location coordinates of a user, age information, viewing time, etc.). In addition, these inputs may be fed into the RNN at the same time whereas a typical N-gram language model may be fed one word at a time. Accordingly, this information may be accounted for and analyzed in a RNN, which provides a distinct advantage and improvement over a typical N-gram language model.

Figure 1:
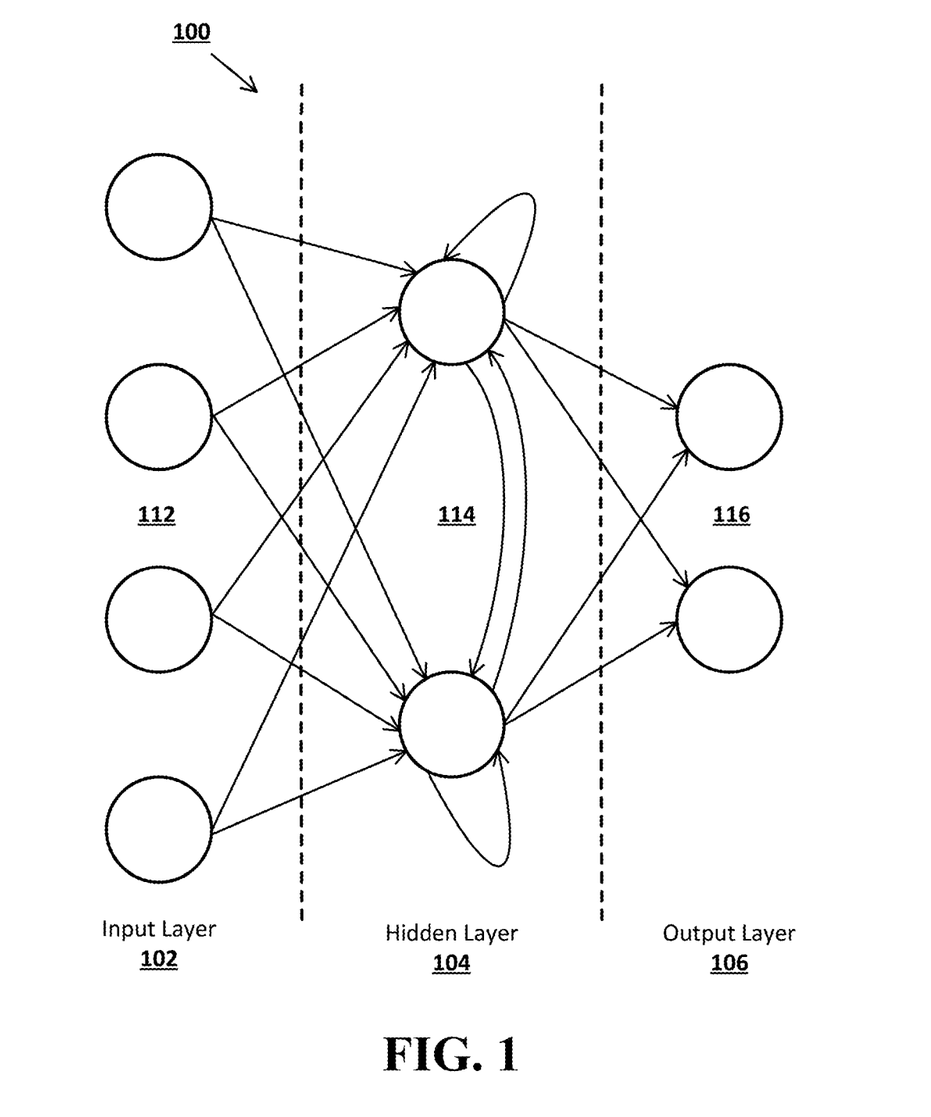
FIG. 1 shows an example representation of a recurrent neural network according to implementation of the disclosed subject matter.

FIG. 1 shows an example representation of a recurrent neural network according to implementation of the disclosed subject matter. As described, a language model may be based on a recurrent neural network (RNN) 100. The RNN 100 may include an input layer 102 with one or more input nodes 112, an output layer 106 with one or more output nodes 116, and a hidden layer 104 with one or more hidden nodes 114 between the input layer 102 and the output layer 104. The input layer 102, hidden layer 104, and output layer 106 may be connected through links and/or connections. It should be noted that the neural network may include any number of layers connected in various configurations. In operation, the RNN 100 receives an input or a set of inputs and produces an output or set of outputs dependent on the inputs and on the weighting values assigned to each node. With the appropriate selection of the weighting values, a variety of computational processes may be performed including language prediction. As shown in the RNN 100, inputs may be received by the hidden layer of nodes and the activations of those nodes may be fed back as inputs to that layer of nodes to produce new activations during a process called back-propagation.

With a particular training (or teaching) algorithm based on a language model, a training set of corresponding inputs and target outputs are presented to the neural network and error values are generated which are used to modify an initial set of weighting values. This process may be repeated to lower the generated error values of the weighting. As described, the training may be based on a user history data. For example, the system may receive a recent viewing history from multiple of users. These individual user histories may be preserved (including the order of viewed videos), but the order in which the data is presented for training may be randomized.

Figure 2:
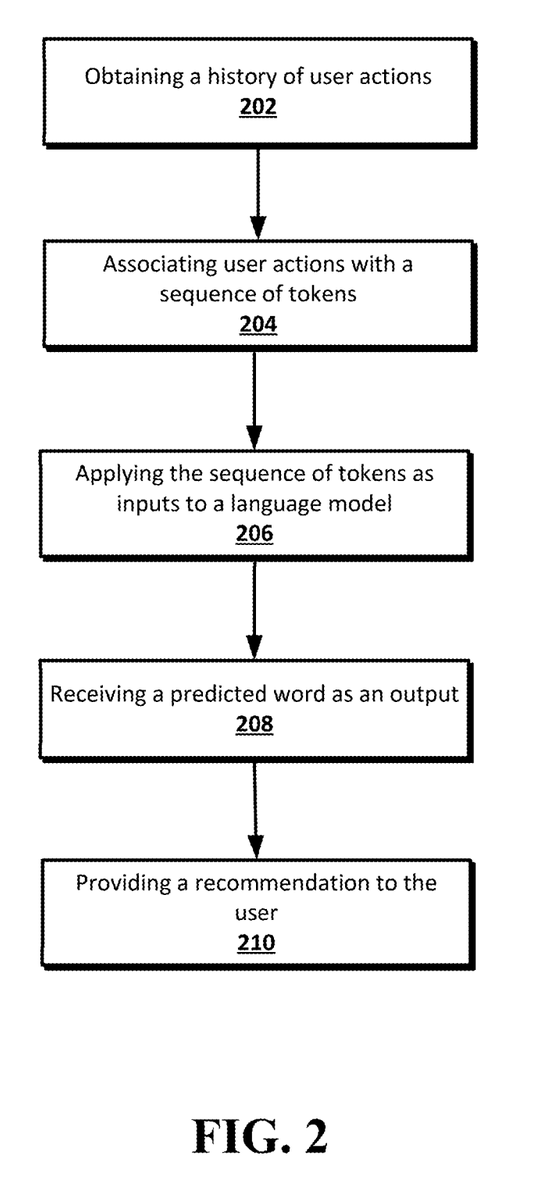
FIG. 2 shows a flow diagram of providing recommendations to a user according to an implementation of the disclosed subject matter.

FIG. 2 shows a flow diagram of providing recommendations to a user according to an implementation of the disclosed subject matter. As described, a computer system may provide a recommendation to a user based on a result from the RNN 100. For example, a system may recommend content based on a user history. In 202, the system may obtain a user history for a user. This user history may include various types of information and may be obtained from and/or stored on a local source (e.g. user history stored on a computer system such as a server) or a remote source (e.g. cache stored on a device of the user). The items of the user history may include a history of accessed media items. The media items may include videos, music, documents (e.g. eBooks), applications ("apps"), and others forms of media and/or content. Accessing media items may include playing (e.g. viewing), downloading, installing, opening, or otherwise "accessing" the media. The items of the user history may also include performed actions such as selecting ads, searching, browsing, navigating, interacting through a social media network, entering commands, and well as other actions. These actions may be referenced in relation to accessing media items such as being performed contemporaneously with accessing a media item (e.g. viewing a video). For example, the system may consider actions that may be performed prior to, during, and immediately after accessing a media item. For instance, performing a search immediately after viewing a video may be noted. In another example, performing an interrupt while accessing a media item (e.g. interrupting a video that is playing) may be noted. This interrupt may include stopping, replaying, skipping, and other available media control commands.

In 204, the system may associate a plurality of items in the obtained user history with a sequence of tokens. The items may be associated with a particular type of token. The token may correspond to various inputs of a recurrent neural network language model (e.g. RNN 100). For example, the token may correspond to elements of the language model such as words and punctuation. Particular items may be associated with a particular type of token. For example, accessed media items may be associated with tokens corresponding to words, and performed actions may be associated with tokens corresponding to punctuation. The punctuation may correspond to language elements such as a period, comma, parentheses, etc., and may be treated as an additional input to the RNN. For example, an end of sentence indicator (e.g. period) may correspond to ending a session action.

In 206, the system may apply the sequence of tokens as inputs to the recurrent neural network language model. In a language model, the tokens may correspond to words of a sentence in a particular spoken language such as English. For example, the model may be given N words as input, such as "this is a" and then output the probability of each word in a vocabulary. Accordingly, the system described herein may apply this language model concept to a sequence of accessed media items (e.g. videos viewed by a user).

In 208, the system may receive a predicted word as an output from the language model in response to the applied sequence of tokens. The received predicted word may correspond to a predicted item. For example, if a user views videos A, B, and C, the system may then predict through the model the probability of viewing videos D, E, or F, or any video (e.g. word) in the vocabulary. In another example, the system may predict that after viewing video C, and given that the user has previously viewed videos A and B, the user will most likely view video D as the next video. In contrast, if the user had previously watched videos X and Y, the system may predict that the user is most likely to watch video Z after viewing video C. The sequences described in the previous examples may be represented as the sequences A, B, C, and D, and X, Y, C, and Z respectively. As shown, these examples illustrate that the video mostly likely viewed by the user as the next video (e.g. best recommendation) may not be determined solely by the most recently viewed video (e.g. video C). Instead, the system may take in consideration the history of the previously viewed videos (e.g. this is analogous to the previous words of a sentence). This may be referred to as the user's trajectory through a video space. In addition, the order of the history may also be determinative. For example, if the order history in the first example above was B, A, C, the system may have predicted a different video (e.g. video E) instead of video D.

In addition, the system may also receive a predicted punctuation as a potential output from the language model in response to the applied sequence of tokens. For example, a valuable predictor may include determining when a user may end a session, which may correspond to an end of sentence indicator. Predicting an end of session may be valuable as it relates to a level user engagement. For example, if the user watches videos A, B, and C, and then an end of session is highly probable, the system may adjust the recommendations to prevent the user from ending a session (e.g. recommend video D after an A, B sequence instead).

As described above, other items may also be predicted as well combinations of items and/or actions. These additional items may correspond to words or punctuation. For example, the sequence of events may correspond to a sequence of advertisements. In addition, the system may provide predictions based on combinations of items. For example, after a sequence of videos is viewed, the system may predict that a user may click on a particular advertisement. Accordingly, advertisements may also be served based on the resultant output.

In 210, the system may provide a recommendation to the user based on the predicted item. The system may determine recommendations according to a particular application. In implementations as described above, the system may determine the recommendations at the time of serving (e.g. real-time) based on the immediate history of that user. Accordingly, in this scenario the recommendations will be uniquely provided for a user's current history. In another implementation, the system may determine the recommendations prior to serving (e.g. pre-compute) based on, for example, a previous session for one or more users (and in some instances all users). For example, the system may determine recommendations for each user on a daily basis based on the user's history for the previous day.

When receiving predicted words, each of the words may be associated with a probability. For example, the output of the language model may include a list of words based on a probability distribution. Accordingly, the organization of a list of recommendations that correspond to the list of words may take into account the probability distribution. For example, the listing of recommended items may be ordered based on the probabilities associated with each of the predicted words (e.g. highest probability on the top of the list).

The present disclosure describes examples relating to accessing media items such as a video. The system may apply the described technique to other forms of recommendations such as music recommendation. In addition, the system may be used for predicting actions for social networking such as the probability of sharing posts and/or replying to posts, as well as other actions that may occur such as rating, recommending, liking and other actions that may occur in the context of a social networking dynamic. Moreover, the system may be applied to essentially any instances relating to modeling user behavior in which the user behavior has some type of structure that can be thought of as containing words and/or punctuation in a language model.

Figure 3:
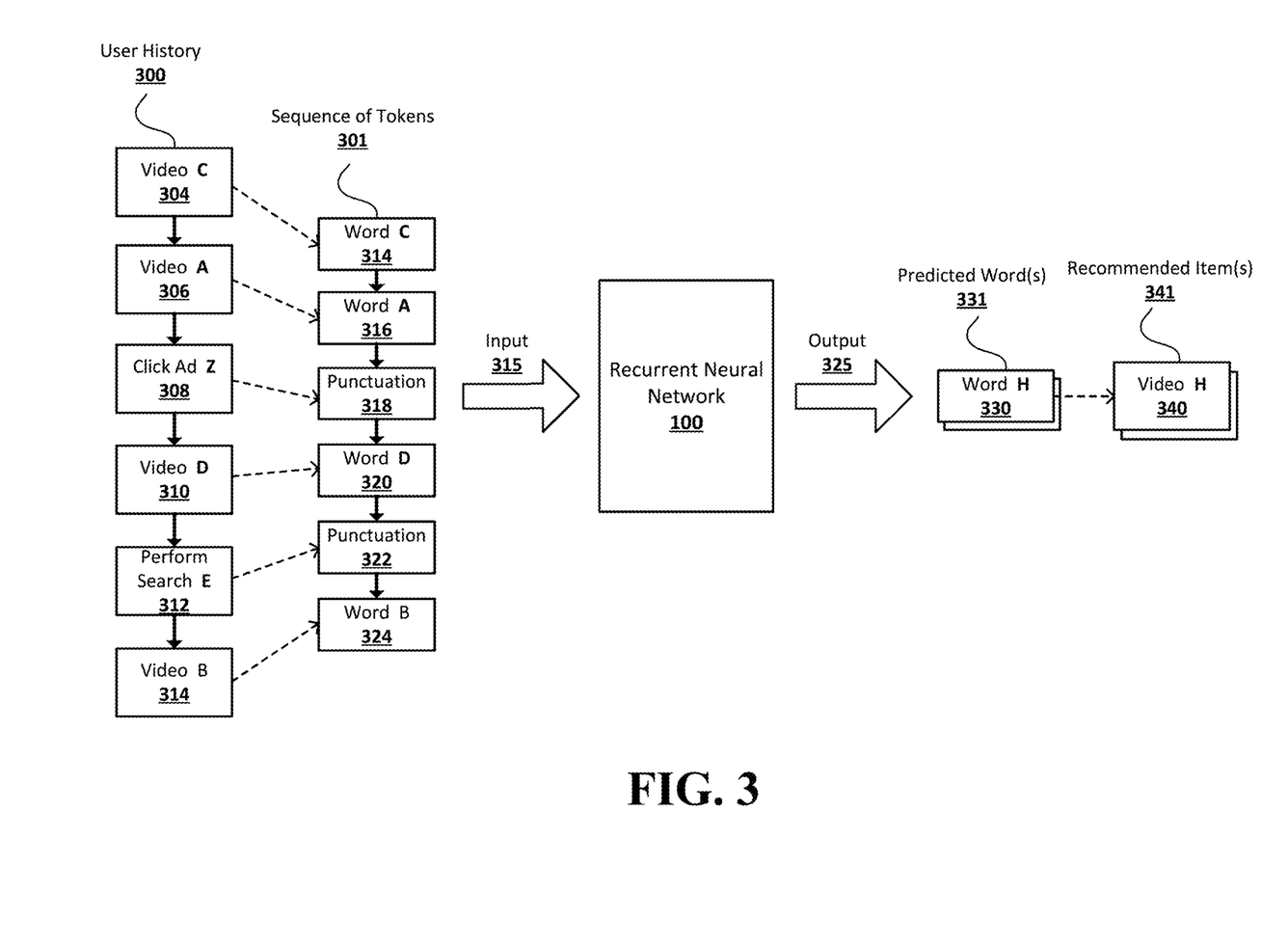
FIG. 3 shows a process flow of data in the recommendation system according to an implementation of the disclosed subject matter.

FIG. 3 shows a process flow of data in the recommendation system according to an implementation of the disclosed subject matter. As described above, a system may provide recommendations based on a user history 300. The user history 300 may include a listing of items. As shown, the user history 300 indicates that a user has accessed items, and in particular, has viewed video C 304 followed by video A 306. The user then performed an action which including clicking ad Z 308. The user then viewed video D 310, followed by performing search E 312, and then viewing video C 314. The user history may include additional information that may be relevant such as an identifier, time information, duration (e.g. how long a video was viewed), and contextual information. The items of the user history 300 may be associated with tokens and the tokens may be categorized according to the language model of the recurrent neural network 100. In this example items (or tokens) may be categorized as (or correspond to) either a word (or a series of words) or a punctuation. As shown, the tokens associated with viewed videos correspond to words (e.g. word C 314, word A 316, word 320 D, and word B 324), and the tokens associated with performed actions (click ad 308 and perform search 312) correspond to punctuation (e.g. punctuation 318 and 322). The tokens may be conceptual in nature or may comprise a specified data structure for inputting into the recurrent neural network (RNN) 100. Accordingly, one or more of the tokens may then be fed as a sequence into the RNN 100 as input 315. The RNN 100 may then process the input as described above in FIG. 1 to provide results as output 325. The output may include one or more predicted words 331. These predictions may be associated with a probability and may include other forms of information. As shown, the one or more predicted words (e.g. word H) and/or related information may be used to provide a recommendation in the form of one or more recommend items 331 (e.g. video H).

Figure 4:
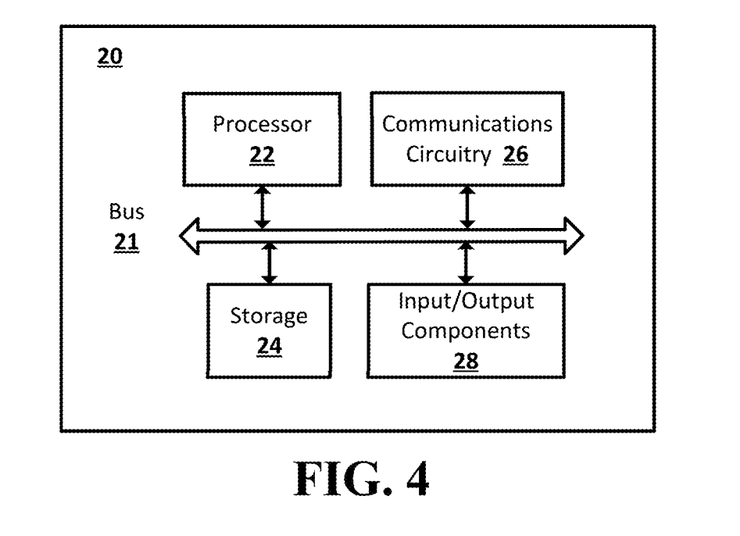
FIG. 4 shows a block diagram of a server according to an implementation of the disclosed subject matter.

FIG. 4 shows a block diagram of a computer system according to an implementation of the disclosed subject matter. Implementations of the disclosed subject matter may be used with a variety of component and network architectures. The computer 20 may include a bus 21 which interconnects major components of the computer 20, such as a processor 22, a storage 24, communications circuitry 26, and input/output components 28. The processor 22 may be any suitable programmable control device and may control the operation of one or more processes as discussed herein and other processes performed by the computer 20.

The storage 24 may be integral with the computer 20 or may be separate and accessed through an interface. The storage 24 may store content (e.g. video, music, photos, applications, and documents etc.), software (e.g., for implementing various functions on computer 20), and other data. The storage 24 may include a suitable storage medium, such as one or more hard-drives, solid state drives, flash drives, and the like.

The input/output components 28 may include outputs components and/or interfaces for a display that provides visual output. The input/output component may also include input components and/or interfaces for user input devices that allow a user to interact with the computer 20. For example, the user input devices may include a keyboard, a keypad, a mouse, touchpad, a touch screen, and the like.

The communications circuitry 26 may include one or more interfaces to allow the computer 20 to communicate with other computers 20, devices 10 and/or databases 29 via one or more local, wide-area, or other networks, as shown in FIG. 2. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor to control such communications intensive tasks such as packet switching, content management, and content delivery.

The computer 20 may host one or more applications configured to manage services that may be associated with a user account. The computer may maintain information related to a user account including account details, preferences, user history, etc.

Figure 5:
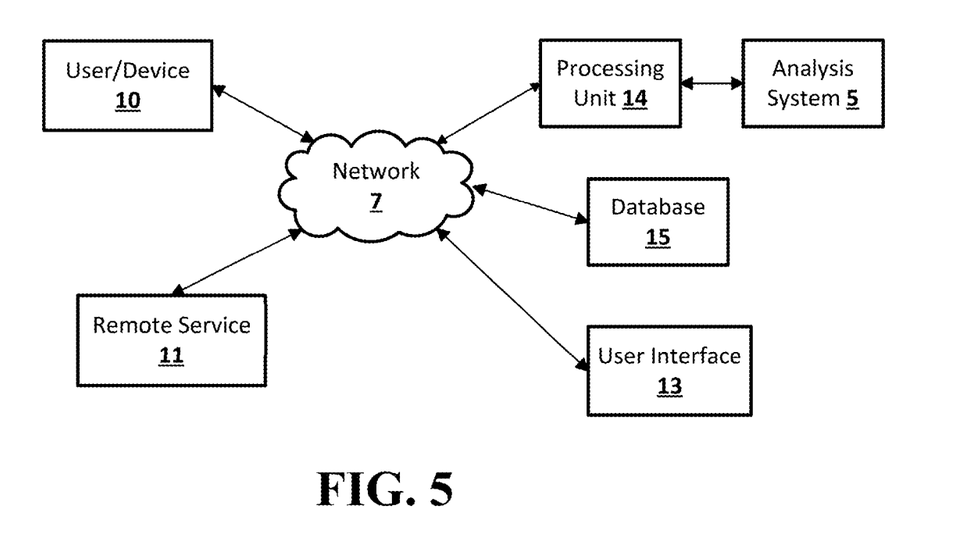
FIG. 5 shows an example network arrangement according to an implementation of the disclosed subject matter.

FIG. 5 shows an example arrangement according to an implementation of the disclosed subject matter. One or more clients 10, 11, such as local computers, smart phones, tablet computing devices, remote services, and the like may connect to other devices via one or more networks 7. The network 7 may be a local network, wide-area network (including the Internet), or any other suitable communication network or networks, and may be implemented on any suitable platform including wired and/or wireless networks. The network 7 may be part of a public and/or a private network any may also include one or more gateways, which facilitate the transfer of data between devices using different protocols. Further, the network 7 may include secure links and/or unsecure links. Additionally, the network 7 may include network infrastructure provided by multiple parties, such as a host network and one or more partner networks (e.g. roaming partners).

The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system may be implemented on the analysis system 5 and may provide various prediction models, data analysis, or the like to one or more other systems 13, 14, 15.

In situations in which the implementations of the disclosed subject matter collect and/or use personal information about users (e.g. a user history, geographic location, or other information associated with a user), the system may provide users with the ability to control and/or set preferences related to the collection of such data. In addition, certain information may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (e.g. ZIP code), so that a particular location of a user cannot be determined. Thus, the user may have control over how user history information may be collected.

Various implementations may include or be embodied in the form of computer-implemented process and an apparatus for practicing that process. Implementations may also be embodied in the form of a non-transitory computer-readable storage and/or memory containing instructions, wherein, when the instructions are loaded into and executed by a computer (or processor), the computer becomes an apparatus for practicing implementations of the disclosed subject matter.

The flow diagrams described herein are included as examples. There may be variations to these diagrams or the steps (or operations) described therein without departing from the implementations described herein. For instance, the steps may be performed in parallel, simultaneously, a differing order, or steps may be added, deleted, or modified. Similarly, the block diagrams described herein are included as examples. These configurations are not exhaustive of all the components and there may be variations to these diagrams. Other arrangements and components may be used without departing from the implementations described herein. For instance, components may be added, omitted, and may interact in various ways known to an ordinary person skilled in the art.

References to "one implementation," "an implementation," "an example implementation," and the like, indicate that the implementation described may include a particular step, feature, structure, or characteristic, but every implementation may not necessarily include the particular step, feature, structure, or characteristic. Moreover, such phrases are not necessarily referring to the same implementation. Further, when a particular step, feature, structure, or characteristic is described in connection with an implementation, such step, feature, structure, or characteristic may be included in other implementations whether or not explicitly described. The term "substantially" may be used herein in association with a claim recitation and may be interpreted as "as nearly as practicable," "within technical limitations," and the like.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
obtaining a sequence of tokens that represent a user history for a user, the sequence of tokens including one or more first tokens and one or more second tokens, each of the one or more first tokens being associated with a respective media item presented to the user and each of the one or more second tokens being associated with a respective action performed by the user;
obtaining a target output for the sequence of tokens, the target output identifying a next token subsequent to the last token in the sequence of tokens;
processing the sequence of tokens using a neural network having a plurality of weighting values, the neural network being configured to:
process each token in the sequence of tokens in accordance with the weighting values to predict, after processing a last token in the sequence of tokens, an output token that is the next token subsequent to the last token in the sequence of tokens;
determining an error value between the target output and the output token generated by the neural network; and
training the neural network by modifying the weighting values to lower the error value.

2. The method of claim 1, wherein the respective actions performed by the user include:
selecting an advertisement, performing a search, visiting a webpage, navigating a webpage, rating a media item, sharing a media item, or interrupting a played media item.

3. The method of claim 1, wherein the respective actions performed by the user include ending a session.

4. The method of claim 1, wherein the respective media items presented to the user include:
videos, music, documents, or data of applications.

5. The method of claim 1, wherein the neural network is a recurrent neural network.

6. The method of claim 5, wherein the neural network is configured to sequentially process each token in the sequence of tokens.

7. The method of claim 1, further comprising:
obtaining a sequence of new tokens that represent a new user history for a new user, the sequence of new tokens including one or more new first tokens and one or more new second tokens, each of the one or more new first tokens being associated with a respective media item presented to the new user and each of the one or more new second tokens being associated with a respective action performed by the new user;
processing each new token in the sequence of new tokens in accordance with the modified weighting values to predict, after processing a last new token in the sequence of new tokens, a first output token that should be the next token subsequent to the last new token in the sequence of new tokens; and
providing a recommendation to the user based on a media item or an action associated with the predicted first output token.

8. The method of claim 7, wherein the neural network is configured to:
associate each of a plurality of candidate tokens with a respective probability, and
determine the first output token from the plurality of candidate tokens based on the respective probabilities for the plurality of candidate tokens.

9. The method of claim 8, wherein the recommendation to the user is provided as a list identifying media items or actions associated with the plurality of candidate tokens for the first output token.

10. The method of claim 9, wherein the media items or the actions associated with the plurality of candidate tokens for the first output token are ordered in the list based on probabilities associated with the plurality of candidate tokens.

11. A system comprising one or more computers and one or more storage devices storing instructions that, when executed by one or more computers, cause the one or more computers to perform operations comprising:
obtaining a sequence of tokens that represent a user history for a user, the sequence of tokens including one or more first tokens and one or more second tokens, each of the one or more first tokens being associated with a respective media item presented to the user and each of the one or more second tokens being associated with a respective action performed by the user;
obtaining a target output for the sequence of tokens, the target output identifying a next token subsequent to the last token in the sequence of tokens;
processing the sequence of tokens using a neural network having a plurality of weighting values, the neural network being configured to:
process each token in the sequence of tokens in accordance with the weighting values to predict, after processing a last token in the sequence of tokens, an output token that is the next token subsequent to the last token in the sequence of tokens;
determining an error value between the target output and the output token generated by the neural network; and
training the neural network by modifying the weighting values to lower the error value.

12. The system of claim 11, wherein the respective actions performed by the user include:
selecting an advertisement, performing a search, visiting a webpage, navigating a webpage, rating a media item, sharing a media item, or interrupting a played media item.

13. The system of claim 11, wherein the respective actions performed by the user include ending a session.

14. The system of claim 11, wherein the respective media items presented to the user include:
videos, music, documents, or data of applications.

15. The system of claim 11, wherein the neural network is a recurrent neural network.

16. The system of claim 15, wherein the neural network is configured to sequentially process each token in the sequence of tokens.

17. The system of claim 11, wherein the operations further comprise:
obtaining a sequence of new tokens that represent a new user history for a new user, the sequence of new tokens including one or more new first tokens and one or more new second tokens, each of the one or more new first tokens being associated with a respective media item presented to the new user and each of the one or more new second tokens being associated with a respective action performed by the new user;
processing each new token in the sequence of new tokens in accordance with the modified weighting values to predict, after processing a last new token in the sequence of new tokens, a first output token that should be the next token subsequent to the last new token in the sequence of new tokens; and providing a recommendation to the user based on a media item or an action associated with the predicted first output token.

18. A computer-readable storage device encoded with a computer program, the computer program comprising instructions that, when executed by one or more computers, cause the one or more computers to perform operations comprising:

obtaining a sequence of tokens that represent a user history for a user, the sequence of tokens including one or more first tokens and one or more second tokens, each of the one or more first tokens being associated with a respective media item presented to the user and each of the one or more second tokens being associated with a respective action performed by the user;

obtaining a target output for the sequence of tokens, the target output identifying a next token subsequent to the last token in the sequence of tokens;

processing the sequence of tokens using a neural network having a plurality of weighting values, the neural network being configured to:

process each token in the sequence of tokens in accordance with the weighting values to predict, after processing a last token in the sequence of tokens, an output token that is the next token subsequent to the last token in the sequence of tokens;

determining an error value between the target output and the output token generated by the neural network; and training the neural network by modifying the weighting values to lower the error value.

19. The computer-readable storage device of claim 18, wherein the respective actions performed by the user include ending a session.

20. The computer-readable storage device of claim 18, wherein the operations further comprise:

obtaining a sequence of new tokens that represent a new user history for a new user, the sequence of new tokens including one or more new first tokens and one or more new second tokens, each of the one or more new first tokens being associated with a respective media item presented to the new user and each of the one or more new second tokens being associated with a respective action performed by the new user;

processing each new token in the sequence of new tokens in accordance with the modified weighting values to predict, after processing a last new token in the sequence of new tokens, a first output token that should be the next token subsequent to the last new token in the sequence of new tokens; and providing a recommendation to the user based on a media item or an action associated with the predicted first output token.

\* \* \* \* \*